(12) United States Patent
Salter et al.

(10) Patent No.: US 9,889,801 B2
(45) Date of Patent: Feb. 13, 2018

(54) VEHICLE LIGHTING ASSEMBLY

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 83 days.

(21) Appl. No.: 15/210,396

(22) Filed: Jul. 14, 2016

(65) Prior Publication Data
US 2018/0015887 A1 Jan. 18, 2018

(51) Int. Cl.
| | |
|---|---|
| *F21V 11/00* | (2015.01) |
| *B60R 13/00* | (2006.01) |
| *F21S 8/10* | (2006.01) |
| *F21V 9/16* | (2006.01) |

(52) U.S. Cl.
CPC .......... *B60R 13/005* (2013.01); *F21S 48/125* (2013.01); *F21S 48/1225* (2013.01); *F21S 48/13* (2013.01); *F21S 48/15* (2013.01); *F21S 48/31* (2013.01); *F21V 9/16* (2013.01)

(58) Field of Classification Search
CPC ... B60R 13/005; F21S 48/1225; F21S 48/125; F21S 48/13; F21S 48/15; F21S 48/30; F21S 48/31
USPC .......................................... 362/507, 509–510
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle lighting assembly is provided herein. The vehicle lighting assembly includes a lens and a housing attached to the lens. One or more indicia defined by recessed portions are disposed on a component of the housing. A photoluminescent structure is disposed within and substantially filling the recessed portion and is configured to luminesce in response to receiving an excitation light emitted by a light source. A protective layer is disposed over the photoluminescent structure.

20 Claims, 8 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,408,773 B2 | 4/2013 | Judge |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,503,062 B2 | 8/2013 | Baur et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,749,873 B2 | 6/2014 | Albou et al. |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 201729130 U | 2/2011 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102006004977 A1 | 8/2007 |
| DE | 102006057748 A1 | 6/2008 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

US 9,889,801 B2

VEHICLE LIGHTING ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle lighting assembly is disclosed. The vehicle lighting assembly includes a lens and a housing attached to the lens. One or more indicia are defined by one or more recessed portions disposed on a component of the housing. A photoluminescent structure is disposed within and substantially fills the one or more recessed portions and is configured to luminesce in response to receiving an excitation light emitted by a light source. A protective layer is disposed over the photoluminescent structure.

According to another aspect of the present invention, a lighting assembly for a vehicle is disclosed. The lighting assembly includes a lens. A photoluminescent structure is disposed on an inner surface the lens and is configured to luminesce in response to an excitation light. A protective layer is disposed on the photoluminescent structure.

According to yet another aspect of the present invention, a lighting assembly is disclosed. The lighting assembly includes a photoluminescent structure disposed between a housing and an outer lens and is configured to form one or more indicia. The photoluminescent structure is configured to luminesce in response to receiving an excitation light. A light source is disposed within the lighting assembly configured to emit the excitation light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
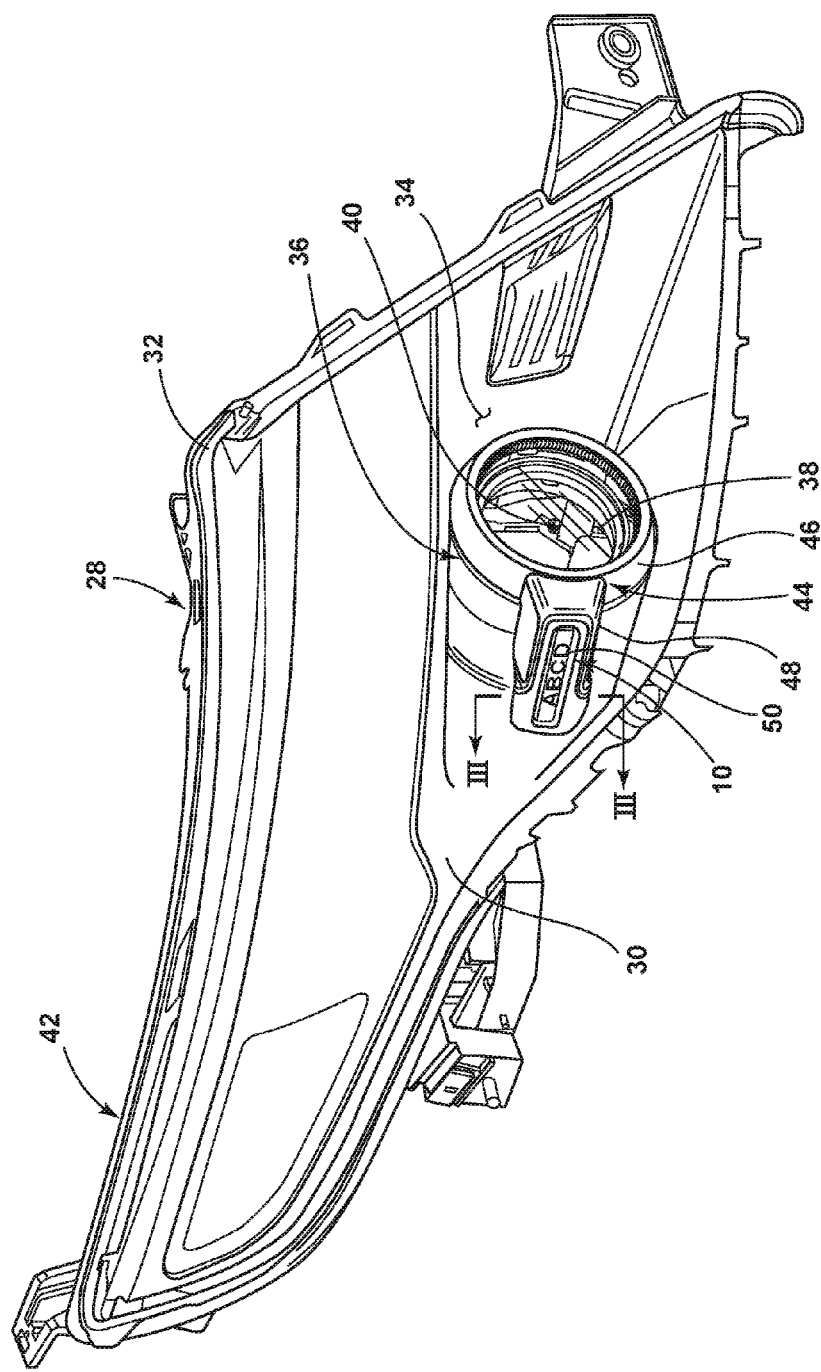
FIG. 2 is a front perspective view of a vehicle lighting assembly having photoluminescent indicia therein, according to one aspect.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting assembly for a vehicle. The lighting assembly may advantageously employ one or more photoluminescent structures that luminesce in response to pre-defined events. The one or more photoluminescent structures may be configured to receive an excitation light and re-emit a converted light at a different wavelength typically found in the visible wavelength spectrum. The converted light may be emitted from the photoluminescent structure for a substantial amount of time once the excitation light is removed.

Figure 1A:
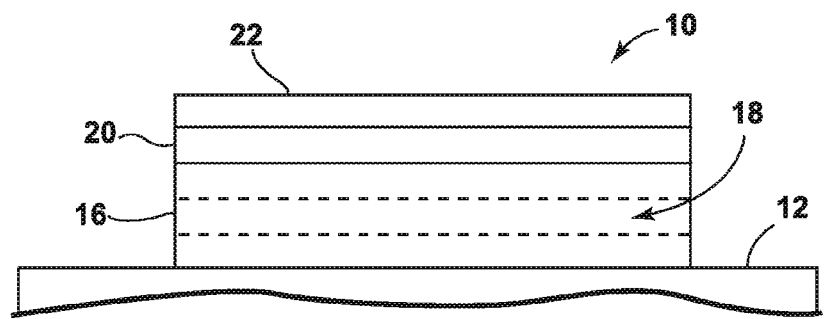
FIG. 1A is a side view of a photoluminescent structure rendered as a coating for use in a trim assembly according to one aspect.
Figure 1B:
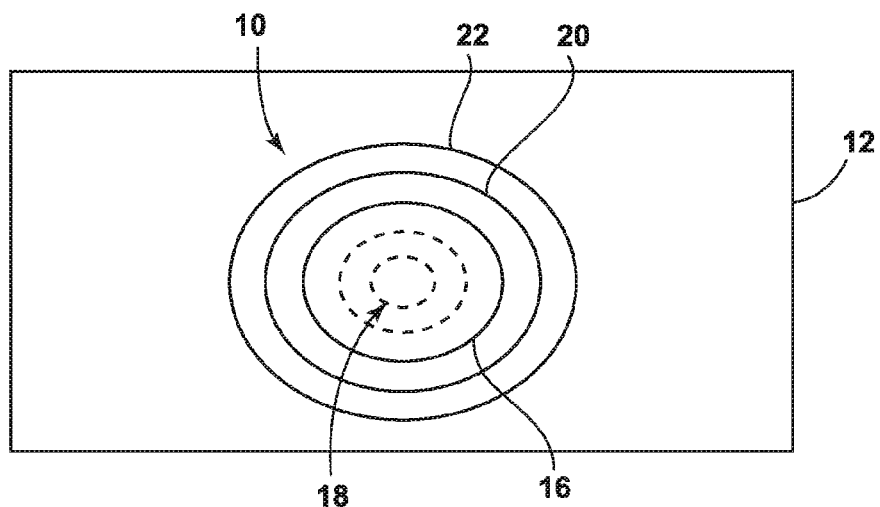
FIG. 1B is a top view of a photoluminescent structure rendered as a discrete particle according to one aspect.
Figure 1C:
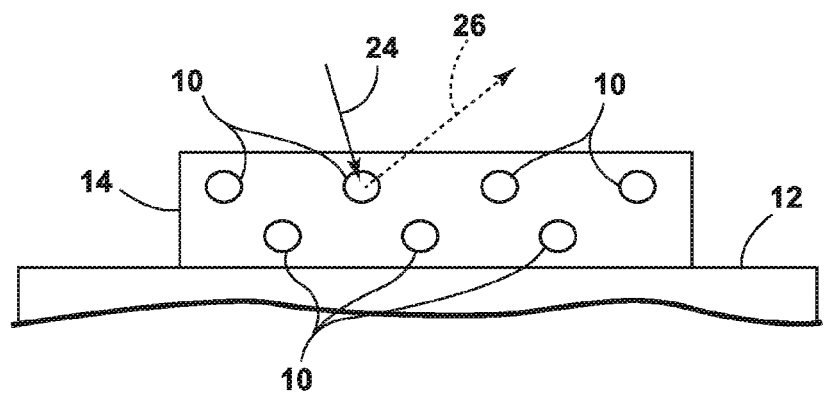
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 40 (FIG. 2) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 40. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 40). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 40 that emits the excitation light 24, including, but not limited to, natural light sources (e.g., the sun) and/or any artificial light source 40. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

With reference to FIG. 2, a lighting assembly 28 includes an outer lens 30 and a housing 32. A cavity 34 may be defined between the outer lens 30 and the housing 32. The lighting assembly 28 may further contain a projection headlamp system 36, or any other type of headlamp system known in the art. A headlamp lens 38 projects light from a light source 40 through outer lens 30 to illuminate a location in front of a vehicle. The lighting assembly 28 may further include any additional light source(s) 40 including, but not limited to, turn signals, running lamps, etc. Though the lighting system in FIG. 2 is illustrated as a vehicle headlamp assembly 42, it will be appreciated that any lighting assembly 28 disposed on and/or within a vehicle is within the scope of the present disclosure. For example, the lighting assembly 28 may be constructed as the headlamp assembly 42, a taillamp assembly, a dome light, and/or any other vehicular lighting system. Alternatively, the lighting assembly 28 may be disposed inside the vehicle.

A trim piece 44 may be mounted in conjunction with the headlamp system 36. The trim piece 44 may include a front ring 46 having a side bezel 48 that includes indicia 50. The indicia 50 may signify the make, model, or any other information that may be desirable to confer about the vehicle to onlookers or occupants thereof. The indicia 50 may have a photoluminescent structure 10 therein that is configured to luminesce in response to receiving excitation light 24 that may be emitted by the light source 40 in a back lit configuration.

Figure 3:
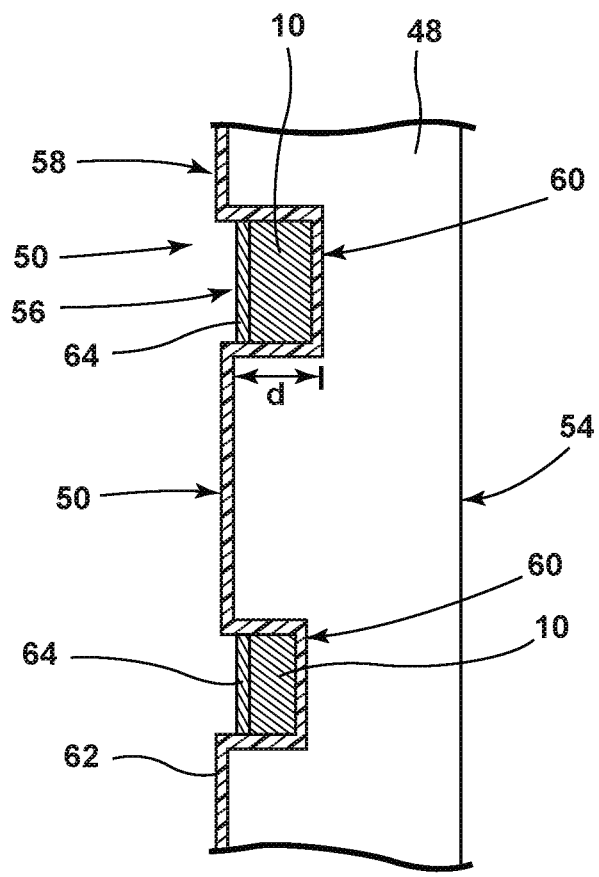
FIG. 3 is a cross-sectional view taken along the line of FIG. 2 illustrating an aspect of the lighting assembly having recessed indicia, according to one aspect.

Referring to FIG. 3, a cross section taken along the line of FIG. 2 illustrates the trim piece 44, according to one embodiment. As illustrated, the trim piece 44 has an outer surface, which is visible from outside the vehicle and a non-visible, inner surface 54.

The indicia 50 may be disposed on and/or defined by an elevational variation in the outer surface. The indicia 50 may include a foreground region 56 and a background region 58. The foreground region 56 and/or the background region 58 may have varied surface characteristics to alter the light transmission through one or both of the regions 56, 58. For example, the foreground region 56 may be brighter (i.e., with more concentration of the transmitted light) by providing a smooth texture on both the outer and inner surfaces 52, 54 since a smooth surface may provide maximum light transmission and minimum diffusion.

According to one embodiment, the foreground region 56 correspond with a recessed portion 60 with respect to the background region 58 to improve visibility of the foreground region 56 under ambient and/or non-luminescent daylight conditions. The recessed portion 60 of the trim piece 44 may be formed through laser etching, molding, or any other method known in the art. As contemplated herein, the foreground region 56 could also refer to the area around the indicia 50 and the background region 58 could refer to the indicia 50, so that the text or other graphic would be perceived as a raised image. It will be appreciated that the recessed portion 60 may be on any component or substrate that forms the lighting assembly 28. For example, as will be described in greater detail below, the recessed portion 60 may be disposed on the housing 32 of the lighting assembly 28 and/or the outer lens 30 and include any feature set forth herein.

All or a part of the outer surface may have a decorative layer 62 thereon. The decorative layer 62 may include a polymeric material or any other suitable material and is configured to control or modify an appearance of the trim piece 44. For example, the decorative layer 62 may be configured to confer a metallic appearance. The metallic appearance can be disposed on the trim piece 44 and/or within the trim piece 44 through any method known in the art, including, but not limited to, sputter deposition, vacuum deposition (vacuum evaporation coating), electroplating, or directly printed onto the trim piece 44 by a computer printer after preparation of the desired pattern through a computer. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In other embodiments, the decorative layer 62 may be tinted any color to complement the vehicle component on which the trim piece 44 is to be received.

With further reference to FIG. 3, the recessed portions 60 may define the indicia 50 and extend a distance d inwardly from the outer surface 52 into the trim piece 44. The photoluminescent structure 10 may be disposed within, or fill a majority portion of, the recessed portions 60 that define the indicia 50 and be operably coupled with one or more light sources 40 within the headlamp assembly 42. Accordingly, the photoluminescent structure 10 may luminesce in response to receiving excitation light 24 when the light source 40 is illuminated and, possibly, for a desired time thereafter. The photoluminescent structure 10 may be in the form of a liquid carrier medium that may be applied within the recessed portions 60 by painting, screen-printing, spraying, slot coating, dip coating, roller coating, and bar coating, and/or any other method known in the art.

A protective layer 64 may be disposed over the photoluminescent structure 10. The protective layer 64 may protect the decorative layer 62, photoluminescent structure 10, and/or the trim piece 44 from physical and chemical damage arising from environmental exposure. The protective layer 64 may have viscoelasticity (i.e. having both viscosity and elasticity), a low Young's modulus, and/or a high failure strain.

According to one embodiment, the protective layer 64 may have a transparency to light in a visible spectrum (e.g., about 400 nm to about 700 nm) of greater than about 50%, 60%, 70%, 80%, 90% or 99%. For example, the protective layer 64 may be composed of silicone, polyisoprene, polybutadiene, chloroprene, butyl rubber, nitrile rubber, fluorosilicate, fluoroelastomers, ethylene vinyl acetate, other soft polymeric materials, and/or combinations thereof. The protective layer 64 may have a thickness of between about 0.01 mm to about 10.0 mm, or between about 0.25 mm to about 0.5 mm. In silicone examples of the protective layer 64, the protective layer 64 may have a density of about 1150 kg/m$^2$. In some examples, the protective layer 64 may include a colorant, such that the indicia 50 appear in a first color (e.g., white) when the photoluminescent structure 10 under the protective layer 64 is in a non-luminescent state and a second color (e.g., blue) when the photoluminescent structure 10 under the protective layer 64 luminesces.

The protective layer 64 may be formed by over-molding the trim piece 44 using a liquid polymer. The over-molding liquid polymer may have a viscosity of less than about 2000 pa·s, less than about 1000 pa·s, or less than about 100 pa·s when over-molded onto the trim piece 44. It will be appreciated that any process described herein may be utilized in conjunction with any component of the lighting assembly 28 for forming indicia 50 having the photoluminescent structure 10 thereon and/or therein. As noted above the layers and construction used in reference to FIG. 3 may be utilized on any component within the lighting assembly 28.

Figure 4:
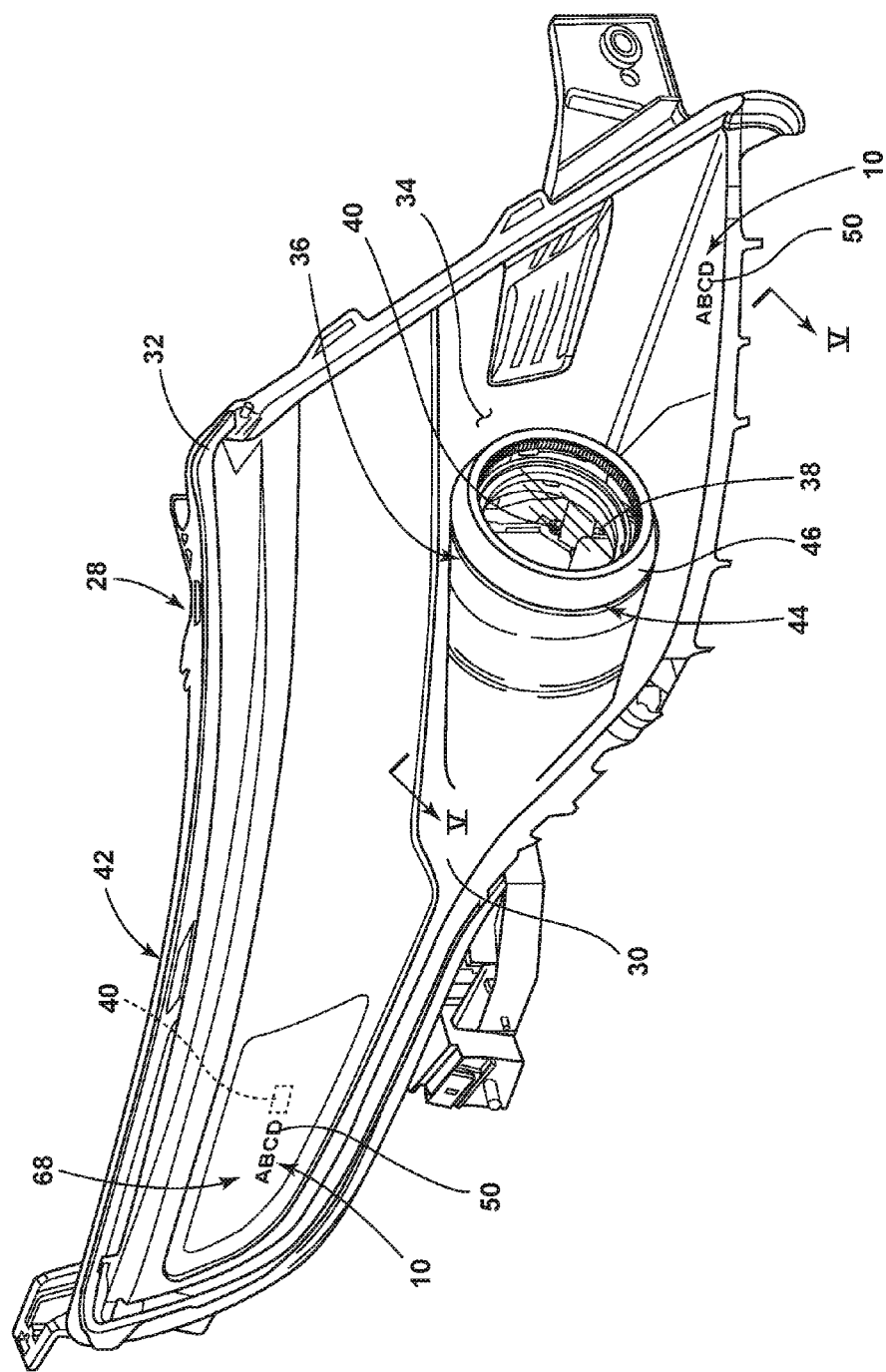
FIG. 4 is a perspective view of a lighting assembly having photoluminescent indicia on a forward portion and a lateral portion of an outer lens, according to one aspect.
Figure 5:
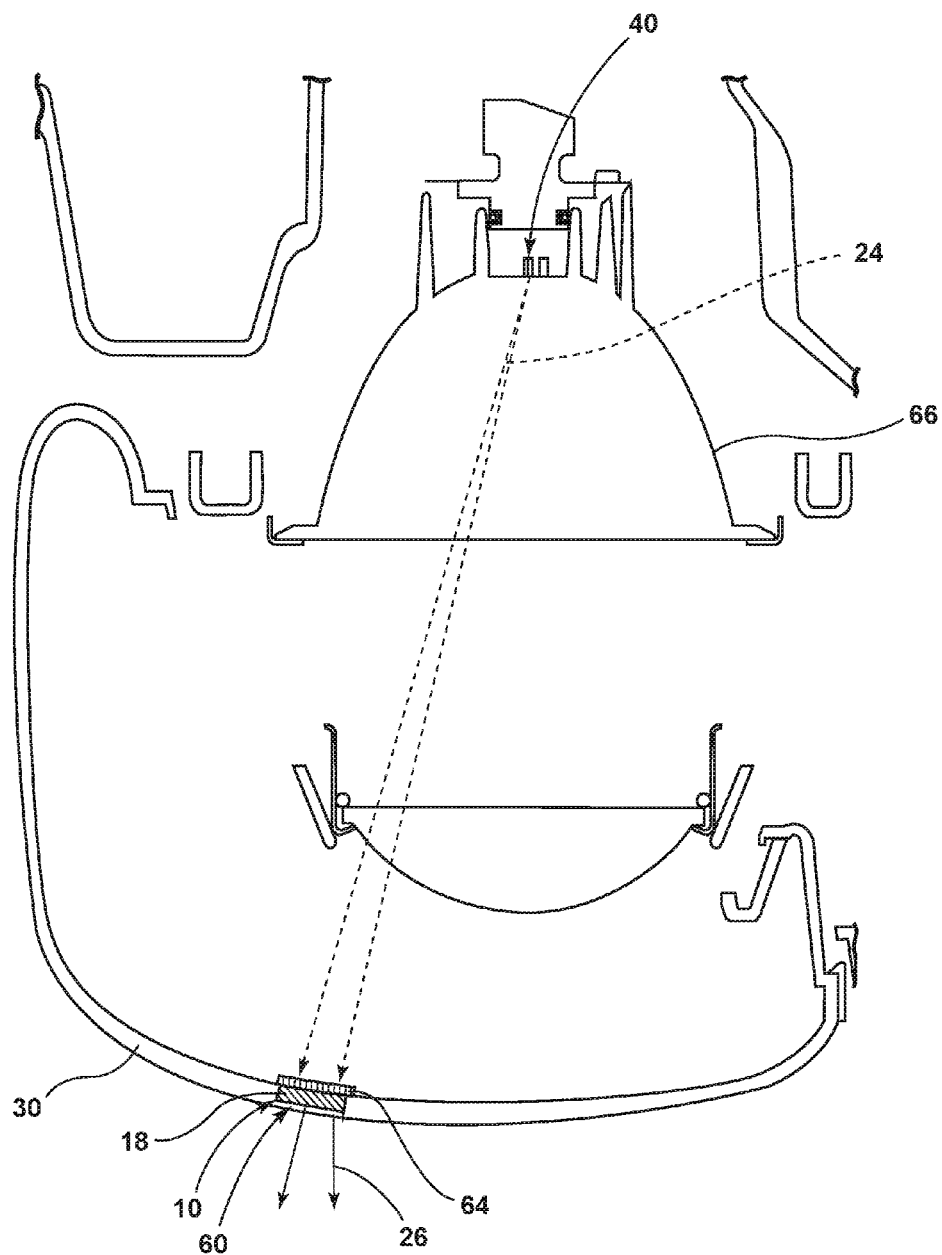
FIG. 5 is a cross-sectional view taken along the line V-V of FIG. 4 illustrating an aspect of the lighting assembly having photoluminescent indicia on the outer lens, according to one aspect.

Referring to FIGS. 4 and 5, the light source 40 is mounted together with a reflector 66. Outputted light from the light source 40 and the reflector 66 are focused for providing a light beam toward the roadway. Excitation light 24 from the light source 40 may also be directed towards the indicia 50 having the photoluminescent structure 10 thereon.

In some embodiments, the photoluminescent structure 10 may contain a long persistence photoluminescent material 18 that continues to luminesce after removal of the excitation light 24. As discussed above, the long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually luminesce in response to excitation from any light source(s) 40 that emits the excitation light 24, including, but not limited to, natural light sources (e.g., the sun) and/or any artificial light source 40. The periodic absorption of the excitation light 24 from any excitation source may provide for a substantially sustained charge of the long persistence photoluminescent material 18 to provide for consistent passive illumination.

Referring to FIG. 4, additionally, or alternatively, the indicia 50 having the photoluminescent structure 10 thereon and/or therein may be disposed on a lateral portion 68 of the headlamp assembly 42. The indicia 50 may be visible in a non-luminescent state and luminesce in response to receiving excitation light 24 from one or more light sources 40 within the headlamp assembly 42. For example, a running light or marker light within the headlamp assembly 42 may provide excitation light 24 for the photoluminescent structure 10.

Figure 6:
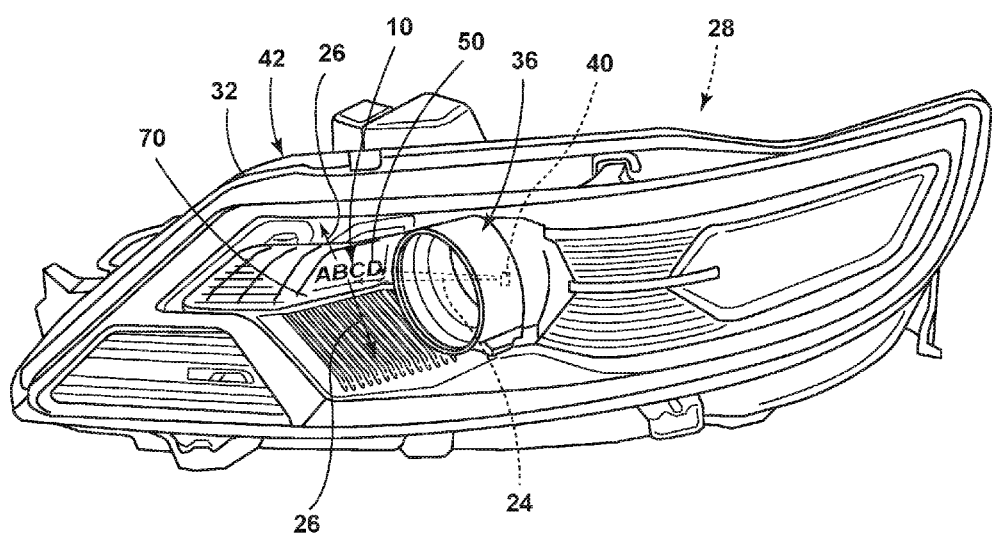
FIG. 6 is a perspective view of the headlamp assembly having recessed indicia on an outer surface of the housing and within a cavity of the lighting assembly, according to one aspect.

Referring to FIG. 6, an outer surface 70 of the headlamp housing 32, disposed within the cavity 34, may include the indicia 50, which may be recessed or raised in comparison to the portion of the housing 32 surrounding the indicia 50. As described above, the indicia 50 may have the photoluminescent structure 10 therein and/or thereon. The photoluminescent structure 10 may be excited by light emitted by the projection headlamp system 36 in a front lit configuration thereby providing a higher intensity of light to the photoluminescent structure 10.

The housing 32 may include the decorative layer 62 and/or protective layer 64 thereon. Moreover, the protective layer 64 may coincide with the indicia 50 and/or the photoluminescent structure 10 such that the indicia 50 appear in a first color when the photoluminescent structure 10 is non-luminescent and a second color when the indicia 50 luminesce.

Figure 7:
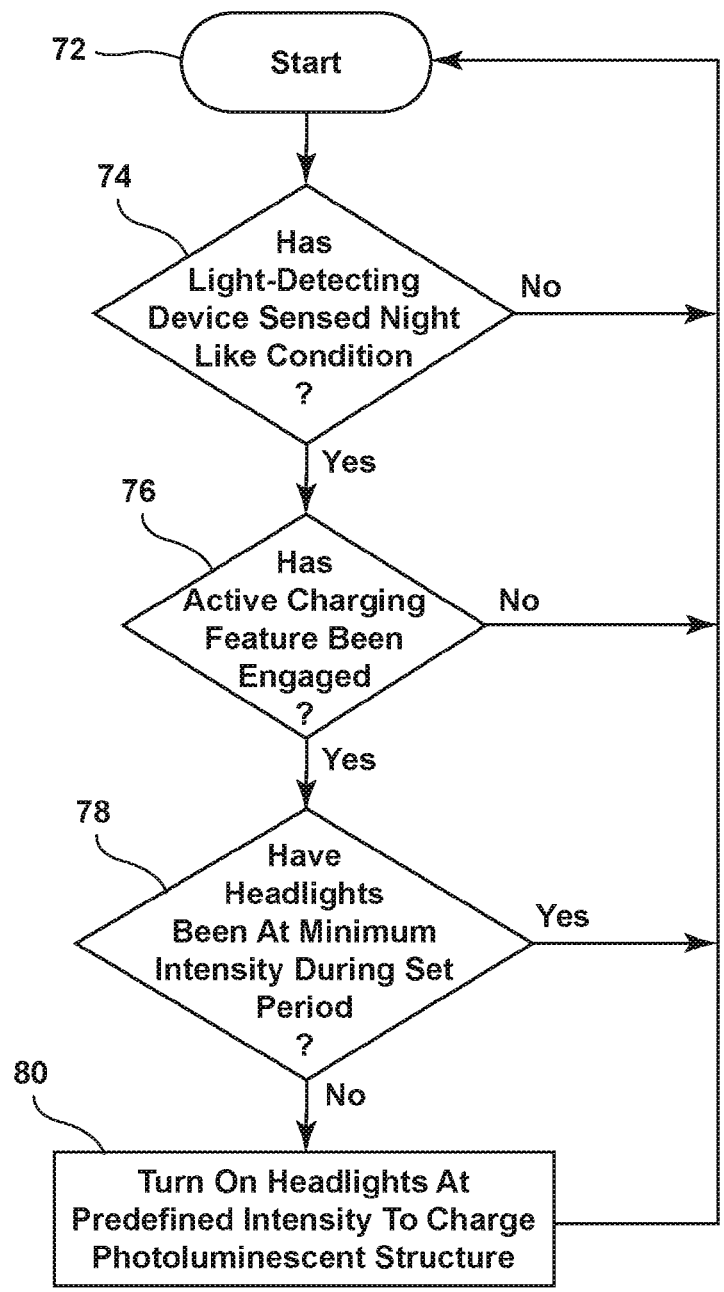
FIG. 7 is a flow diagram illustrating a method for intermittently exciting the photoluminescent indicia, according to one aspect.

Referring to FIG. 7, according to one embodiment, the lighting assembly 28 may be configured to provide continued luminescence of the photoluminescent structure 10. For example, the vehicle may include a light-detecting device that is operably coupled with a controller. The light detecting device senses the environmental lighting conditions, such as whether the vehicle is in day-like conditions (i.e., higher light level conditions) and/or whether the vehicle is in night-like conditions (i.e., lower light level conditions). The light-detecting device can be of any suitable type, and can detect the day-like and night-like conditions in any suitable fashion. For instance, in one embodiment, the light-detecting device includes a light sensor that detects the amount of light (e.g., solar radiation) affecting the vehicle for determining whether day-like or night-like conditions exist.

To provide for continued luminescence, the method provided herein begins at step 72. At step 74, the light-detecting device determines the environmental light characteristics of the vehicle. If night-like conditions are detected, at step 76, the vehicle determines whether an active charging feature is engaged. If the active charging feature is engaged, the controller, at step 78, stores a length of time that the headlamps have been unilluminated. At step 80, the controller illuminates the headlamp of the vehicle to re-excite the photoluminescent structure 10 thereby providing for continued luminescence of the photoluminescent structure 10.

As discussed above, the photoluminescent structure 10 may contain a long persistence photoluminescent material 18. The long persistence photoluminescent material 18 may be excited by the light source 40 at a high intensity, or, in some instances, a low intensity may only be necessary, in a short amount of time. For example, the light source 40 of the headlamp may be configured as a high intensity LED, a halogen light, a high-intensity discharge lamp (HID lamps), etc. Due to the intensity of these types of light sources 40, in some embodiments, the photoluminescent material 18 may be charged in less than five minutes to provide continued luminescence when the vehicle is in a non-running state.

Figure 8:
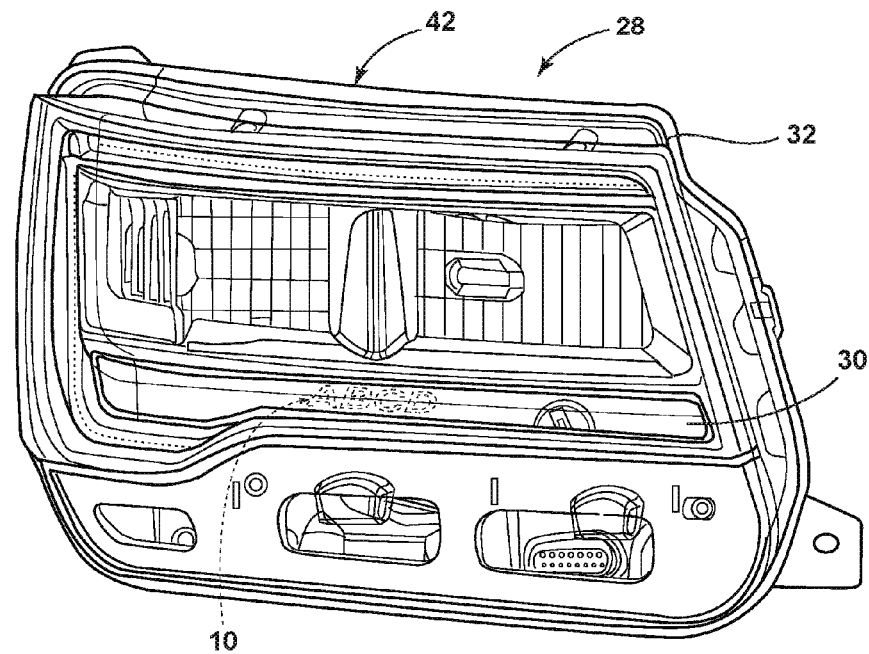
FIG. 8 is a headlamp assembly having photoluminescent indicia thereon that are non-visible when the indicia are in a non-luminescent state, according to one aspect.
Figure 9:
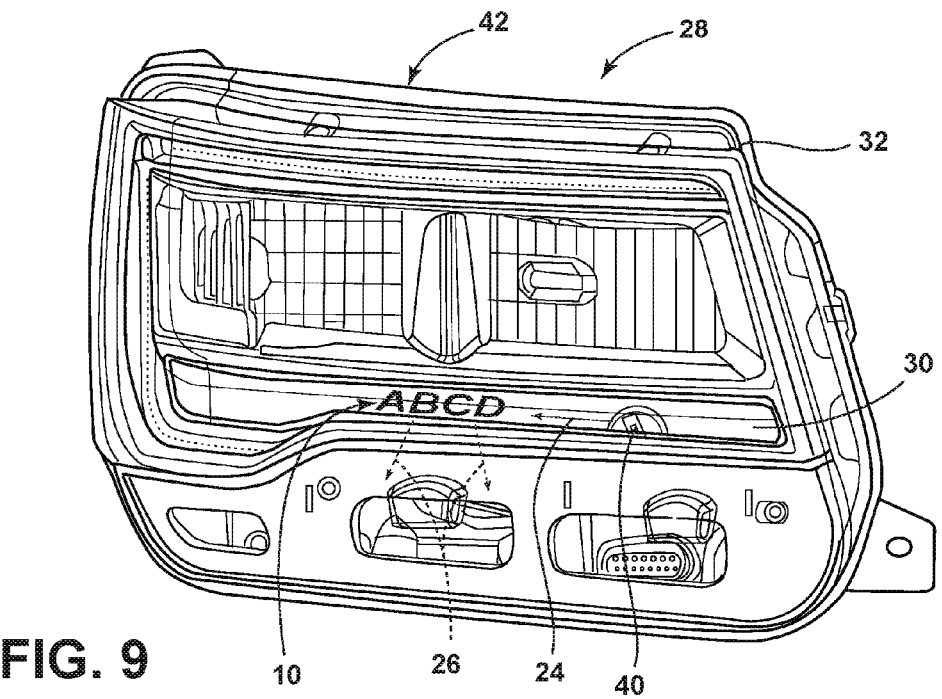
FIG. 9 is the headlamp assembly of FIG. 8 having the photoluminescent indicia in a luminescent state.

Referring to FIGS. 8 and 9, the photoluminescent structure 10 may be disposed on a central portion, or any other portion, of the outer lens 30 of the headlamp assembly 42. According to some embodiments, the photoluminescent structure 10 may be substantially non-visible when a corresponding excitation source is unilluminated, as shown in FIG. 8. When a corresponding light source 40 is illuminated, the photoluminescent structure 10 may luminesce in response to receiving excitation light 24 from the light source 40, as shown in FIG. 9.

A wide range of photoluminescent materials 18 that luminesce in response to UV light, or any other wavelength of excitation light 24, may be substantially non-visible in an unexcited state, each of which may be utilized without departing from the scope of the present disclosure. Upon illumination of an associated light source 40, the photoluminescent material 18 may luminesce in the visible portion of the light spectrum. Such a material may be disposed on an interior surface of the outer lens 30 through a wide range of processes. For example, the photoluminescent material 18 may be applied to the housing 32 through painting, printing, spraying, slot coating, dip coating, roller coating, and bar coating.

According to another embodiment, the photoluminescent structure 10 may include a mixture of UV and IR excitable photoluminescent materials 18 therein such that a large spectrum of headlamp assemblies include light sources 40 capable of exciting the photoluminescent structure 10. As discussed above, the protective layer 64 may be disposed over the photoluminescent structure 10 to protect the photoluminescent structure 10 from physical and chemical damage arising from environmental exposure. The protective layer 64 may be substantially transparent such that the indicia 50 may be substantially visible when the photoluminescent structure 10 is in a luminescent state.

Accordingly, a lighting assembly for a vehicle has been advantageously described herein. The lighting assembly may provide various benefits including a simple and cost-effective means to produce a variety of illumination features that may be used as a styling feature and/or to provide active and/or passive exterior lighting to the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lighting assembly, comprising:
   a housing attached to a lens;
   one or more indicia defined by one or more recessed portions disposed on a component of the housing;
   a photoluminescent structure disposed within the one or more recessed portions and configured to luminesce in response to receiving an excitation light emitted by a headlamp projection source; and
   a protective layer disposed over the photoluminescent structure.

2. The vehicle lighting assembly of claim 1, wherein the photoluminescent structure includes at least one photoluminescent material configured to convert an excitation light into a converted light.

3. The vehicle lighting assembly of claim 1, wherein the first photoluminescent structure includes a long persistent photoluminescent material therein.

4. The vehicle lighting assembly of claim 1, wherein the protective layer makes the indicia appear to be a first color when the photoluminescent structure is non-luminescent and the photoluminescent structure emits converted light of a second color when the photoluminescent structure receives the excitation light.

5. The vehicle lighting assembly of claim 1, wherein the excitation light comprises one of blue light, violet light, and UV light.

6. The vehicle lighting assembly of claim 1, wherein the indicia are disposed on a trim piece within a cavity of the lighting assembly.

7. The vehicle lighting assembly of claim 6, wherein the headlamp projection source intermittently illuminates to provide continued luminescence of the photoluminescent structure.

8. A vehicle lighting assembly, comprising:
   a photoluminescent structure disposed on an inner surface of a lens and configured to luminesce in response to an excitation light from a projection headlamp; and
   a protective layer disposed on the photoluminescent structure.

9. The vehicle lighting assembly of claim 8, wherein the photoluminescent structure includes a long persistent photoluminescent material therein.

10. The vehicle lighting assembly of claim 8, wherein the first photoluminescent structure comprises at least one photoluminescent material configured to convert an excitation light into a visible converted light that is outputted to a viewable portion.

11. The vehicle lighting assembly of claim 10, wherein the excitation light comprises one of blue light, violet light, and UV light.

12. The vehicle lighting assembly of claim 8, wherein the photoluminescent structure and the protective layer are substantially non-visible in a non-luminescent state.

13. The vehicle lighting assembly of claim 8, wherein the protective layer is translucent such that the indicia appear in a first color when the photoluminescent structure is non-luminescent and a second color when the photoluminescent structure is excited by the excitation light.

14. The vehicle lighting assembly of claim 9, wherein the projection headlamp intermittently emits excitation light to provide continued luminescence of the photoluminescent structure.

15. A vehicle lighting assembly, comprising:
 a photoluminescent structure disposed between a housing and an outer lens and configured to form one or more indicia; and
 a headlamp projection source disposed within the lighting assembly configured to emit an excitation light to excite the photoluminescent structure.

16. The vehicle lighting assembly of claim 15, wherein the photoluminescent structure and a protective layer are substantially non-visible in a non-luminescent state.

17. The vehicle lighting assembly of claim 15, wherein a protective layer is translucent such that the indicia appear in a first color when the photoluminescent structure is non-luminescent and a second color when the photoluminescent structure is excited by the excitation light.

18. The vehicle lighting assembly of claim 15, wherein the headlamp projection source intermittently illuminates to provide continued luminescence of the photoluminescent structure.

19. The vehicle lighting assembly of claim 15, wherein the photoluminescent structure is disposed between a decorative layer and a protective layer.

20. The vehicle lighting assembly of claim 19, wherein the photoluminescent structure is disposed in and substantially fills one or more recessed portions in a component of the lighting assembly.

\* \* \* \* \*